United States Patent
Tzikas

[11] Patent Number: 5,268,457
[45] Date of Patent: Dec. 7, 1993

[54] REACTIVE DYES CONTAINING A CHLORO OR FLUOROTRIAZINE GROUP

[75] Inventor: Athanassios Tzikas, Pratteln, Switzerland

[73] Assignee: Ciba-Geigy Corporation, Ardsley, N.Y.

[21] Appl. No.: 999,184

[22] Filed: Dec. 28, 1992

Related U.S. Application Data

[63] Continuation of Ser. No. 764,553, Sep. 20, 1991, abandoned.

[30] Foreign Application Priority Data

Sep. 25, 1990 [CH] Switzerland .................. 3076/90

[51] Int. Cl.$^5$ ............... C09B 62/06; C09B 62/08; C09B 62/085; C09B 62/09; C09B 62/095
[52] U.S. Cl. ........................ 534/618; 534/617; 534/622; 534/627; 534/628; 534/631; 534/632; 534/635; 534/636; 534/637; 534/638; 544/180; 544/181; 544/187; 544/189; 544/190; 544/211; 544/212
[58] Field of Search ............... 534/617, 618, 631, 632, 534/635, 636, 622, 637, 638, 627, 628; 544/187, 188, 190, 211, 212, 181, 180

[56] References Cited

U.S. PATENT DOCUMENTS

| | | | |
|---|---|---|---|
| 4,255,325 | 3/1981 | Harms et al. | 534/638 X |
| 4,474,697 | 10/1984 | Wunderlich et al. | 534/638 |
| 4,523,925 | 6/1985 | Scheibli | 534/638 X |
| 4,664,714 | 5/1987 | Katsura et al. | 534/638 X |
| 4,879,372 | 11/1989 | Morimitsu et al. | 534/638 X |
| 4,994,562 | 2/1991 | Lehmann | 534/618 |
| 5,003,053 | 3/1991 | Springer et al. | 534/638 |

FOREIGN PATENT DOCUMENTS

| | | | |
|---|---|---|---|
| 0096659 | 12/1983 | European Pat. Off. | 534/638 |
| 0267524 | 5/1988 | European Pat. Off. | 534/638 |
| 0405101 | 1/1991 | European Pat. Off. | 534/638 |
| 2729240 | 1/1979 | Fed. Rep. of Germany | 534/638 |
| 2751137 | 5/1979 | Fed. Rep. of Germany | 534/638 |
| 2030168 | 4/1980 | United Kingdom | 534/638 |

OTHER PUBLICATIONS

Chem. Abstract, 115:10844k (1991) Jager et al III.

*Primary Examiner*—Floyd D. Higel
*Attorney, Agent, or Firm*—Marla J. Mathias; George R. Dohmann

[57] ABSTRACT

Reactive dyes of the formula

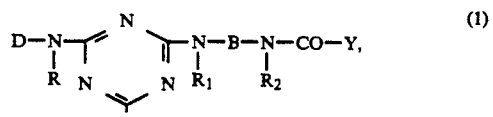

are particularly suitable for dyeing or printing cellulosic fibre materials by the exhaust method or by continuous processes and give, with a high color yield, dyeings and prints with good fastness properties, in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; R is hydrogen or alkyl having 1 to 4 carbon atoms, which can be substituted by hydroxyl, cyano, carboxyl, sulfo or sulfato; X is fluorine or chlorine; B is a substituted or unsubstituted aliphatic or aromatic bridge member; Y is a substituted or unsubstituted aliphatic, aromatic, araliphatic or heterocyclic radical, which is free from reactive groups; $R_2$ is hydrogen or alkyl having 1 to 4 carbon atoms, which can be substituted by halogen, hydroxyl, cyano, $C_1$-$C_4$alkoxy, $C_1$-$C_4$alkoxycarbonyl, carboxyl, carbamoyl, sulfamoyl, sulfo or sulfato; and $R_1$, independently of $R_2$, has the same meaning as $R_2$ or is a radical of the formula

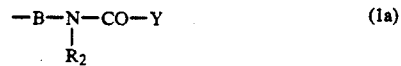

in which B, Y and $R_2$ are as defined under formula (1), independently of these meanings.

7 Claims, No Drawings

REACTIVE DYES CONTAINING A CHLORO OR FLUOROTRIAZINE GROUP

This application is a continuation of application Ser. No. 07/764,553, filed Sep. 20, 1991, now abandoned.

The present Application relates to novel improved reactive dyes which are particularly suitable for dyeing cellulosic fibre materials by the exhaust method or by continuous methods and give wet and light fast dyeings; and to a process for the preparation of these dyes and their use for dyeing or printing textile materials.

The invention relates to reactive dyes of the formula

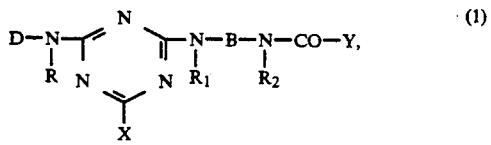

(1)

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; R is hydrogen or alkyl having 1 to 4 carbon atoms, which can be substituted by hydroxyl, cyano, carboxyl, sulfo or sulfato; X is fluorine or chlorine; B is a substituted or unsubstituted aliphatic or aromatic bridge member; Y is a substituted or unsubstituted aliphatic, aromatic, araliphatic or heterocyclic radical, which is free from reactive groups; $R_2$ is hydrogen or alkyl having 1 to 4 carbon atoms, which can be substituted by halogen, hydroxyl, cyano, $C_1$-$C_4$alkoxy, $C_1$-$C_4$alkoxycarbonyl, carboxyl, carbamoyl, sulfamoyl, sulfo or sulfato; and $R_1$, independently of $R_2$, has the same meaning as $R_2$ or is a radical of the formula

(1a)

in which B, Y and $R_2$ are as defined under formula (1), independently of these meanings.

The radical D in formula (1) can contain the customary substituents of organic dyes bonded to its basic structure.

Examples of further substitutents in the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, in particular alkanoylamino groups, such as acetylamino, propionylamino or benzoylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo. The radical D preferably contains one or more sulfonic acid groups. Reactive dyes of the formula (1) in which D is the radical of an azo dye contain as substituents above all methyl, ethyl, methoxy, ethoxy, acetylamino, benzoylamino, amino, chlorine, bromine, ureido, hydroxyl, carboxyl, sulfomethyl or sulfo.

An alkyl radical R is straight-chain or branched; it can be further substituted, for example by hydroxyl, cyano, carboxyl, sulfo or sulfato. Examples of R are: methyl, ethyl, n-propyl, isopropyl, n-butyl, isobutyl, sec-butyl, tert-butyl, sulfomethyl, carboxymethyl, and β-hydroxyethyl.

An alkyl radical $R_1$ or $R_2$ is straight-chain or branched; it can be further substituted, for example by halogen, hydroxyl, cyano, $C_1$-$C_4$alkoxy, $C_1$-$C_4$alkoxycarbonyl, carboxyl, carbamoyl, sulfamoyl, sulfo or sulfato. Examples of $R_1$ and $R_2$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$ and $R_2$ are preferably independently of one another hydrogen, methyl or ethyl.

The aliphatic or aromatic bridge member B is preferably an alkylene, aralkylene or arylene radical. The term aliphatic bridge member also includes cycloaliphatic radicals. B can thus be a $C_1$-$C_{10}$alkylene radical, which is straight-chain or branched; it is in particular a $C_1$-$C_6$alkylene radical, for example methylene, ethylene, propylene, butylene, hexylene or cyclohexylene. An arylene radical B is, for example, a naphthylene radical, the radical of a diphenyl or stilbene or, in particular, a phenylene radical. An aralkylene radical B is, in particular, a benzylene radical. The radical B can contain further substituents, for example halogen atoms, such as fluorine, chlorine and bromine, $C_1$-$C_4$alkyl, such as methyl, ethyl, n-propyl, isopropyl, n-butyl, tert-butyl, isobutyl and sec-butyl, $C_1$-$C_4$alkoxy, such as methoxy, ethoxy, isopropoxy and n-butoxy, carboxyl and sulfo. B is preferably $C_1$-$C_6$alkylene, which can be branched or straight-chain, phenylene, which can be substituted as described, or benzylene, in which case the phenyl ring can be substituted as described for phenylene.

The aliphatic or aromatic radical Y is preferably an alkyl, aralkyl or aryl radical. The term aliphatic radical also includes cycloaliphatic radicals. An alkyl radical Y is, for example, $C_1$-$C_8$alkyl, for example methyl, ethyl, propyl, isopropyl, butyl, isobutyl, sec-butyl, tert-butyl, n-pentyl, n-hexyl or n-octyl. The $C_1$-$C_8$alkyl radical Y can be substituted, for example by halogen, hydroxyl, cyano, carboxyl, $C_1$-$C_4$alkoxy, hydroxy-$C_2$-$C_4$alkoxy, sulfo, sulfato, phenyl and naphthyl, it being possible for the phenyl or naphthyl radical to be further substituted, for example as defined for D. Examples are β-carboxyethyl, β-cyanoethyl, sulfomethyl, β-sulfoethyl, benzyl, and phenethyl.

A cycloaliphatic radical Y is preferably $C_5$-$C_7$cycloalkyl, such as the cyclopentyl, cyclohexyl or cycloheptyl radical, which can be further substituted, for example by $C_1$-$C_4$alkyl. Examples are: cyclopentyl, cyclohexyl, 4-methylcyclohexyl, and cycloheptyl.

An aromatic radical Y is preferably phenyl or naphthyl, it being possible for the radicals to be unsubstituted or substituted, for example phenyl or naphthyl radicals substituted by $C_1$-$C_4$alkyl, for example methyl, ethyl, n-propyl, isopropyl and n-butyl, $C_1$-$C_4$alkoxy, for example methoxy or ethoxy, halogen, for example fluorine, chlorine or bromine, carboxyl, hydroxyl or sulfo.

Heterocyclic radicals Y are, for example, the following radicals: furan, thiophene, pyrazole, pyridine, pyrimidine, quinoline, benzimidazole, benzothiazole and benzoxazole radicals, which can be further substituted, for example by the substituents defined for the radical D.

Preferred embodiments of the reactive dyes of the formula (1) are those in which
a) R is hydrogen, methyl or ethyl;
b) $R_1$ is hydrogen and $R_2$ is hydrogen, methyl or ethyl;
c) B is $C_1$-$C_6$alkylene;
d) Y is $C_1$-$C_6$alkyl, which can be substituted by halogen, hydroxyl, cyano, $C_1$-$C_4$alkoxy, carboxyl or sulfo;
e) Y is a radical

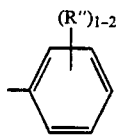

in which R'' is $C_1$-$C_4$alkyl, $C_1$-$C_4$alkoxy, halogen, carboxyl or sulfo; and
f) B is a radical

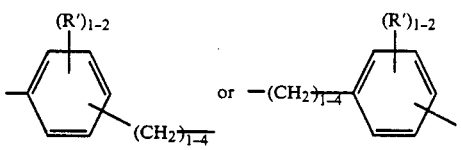

in which R' is $C_1$-$C_4$alkyl, $C_1$-$C_4$alkoxy, halogen, carboxyl or sulfo.

Particularly preferred reactive dyes of the formula (1) are those in which R is hydrogen, methyl or ethyl, $R_1$ is hydrogen, $R_2$ is hydrogen, methyl or ethyl and B is $C_1$-$C_6$alkylene or a radical

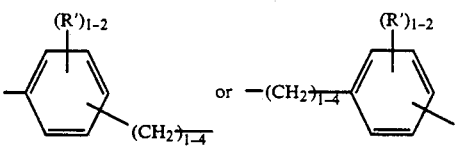

in which R' is $C_1$-$C_4$alkyl, $C_1$-$C_4$alkoxy, halogen, carboxyl or sulfo, and Y is $C_1$-$C_6$alkyl, which can be substituted by halogen, hydroxyl, cyano, $C_1$-$C_4$alkoxy, carboxyl or sulfo, or a radical

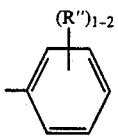

in which R'' is $C_1$-$C_4$alkyl, $C_1$-$C_4$alkoxy, halogen, carboxyl or sulfo.

Especially preferred reactive dyes of the formula (1) are those in which the radical of the formula

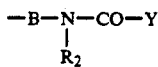

is a radical of the formula

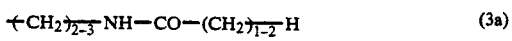 (3a)

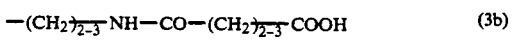 (3b)

 (3c)

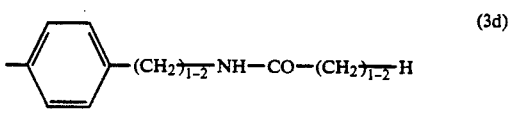 (3d)

and the reactive dyes of the formula (1) which are especially preferred are, in particular, those in which R and $R_1$ are as defined under a) and b) and the radical of the formula

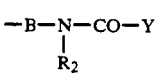

is a radical of the formula (3a) to (3d).

Especially preferred reactive dyes of the formula (1) are those in which D is the radical of a monoazo or disazo, phthalocyanine, formazan or dioxazine dye.

Reactive dyes of the formula (1) which are particularly important are those in which D is a radical of a formazan dye of the formulae

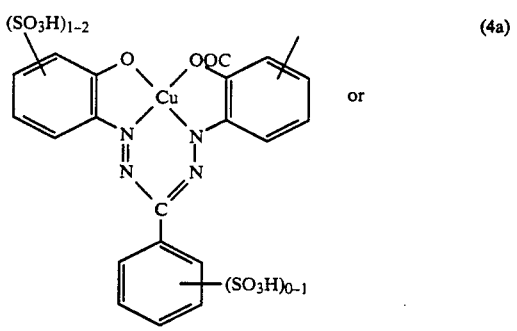 (4a)

or

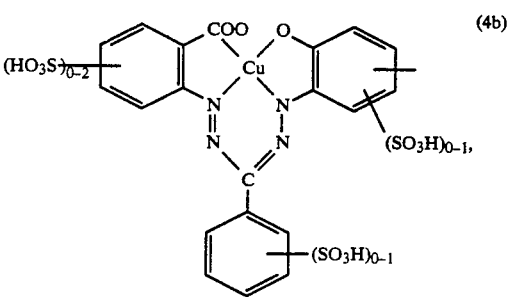 (4b)

in which the benzene nuclei can be further substituted by alkyl having 1 to 4 C atoms, alkoxy having 1 to 4 C atoms, alkylsulfonyl having 1 to 4 C atoms, halogen or carboxyl.

Reactive dyes of the formula (1) which are particularly important are, in particular, those in which D is a radical of the following formulae (5) to (17):

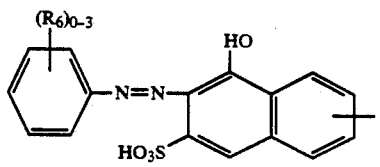 (5)

in which $R_6$ is $C_1$-$C_4$alkyl, $C_1$-$C_4$alkoxy, halogen, carboxyl or sulfo.

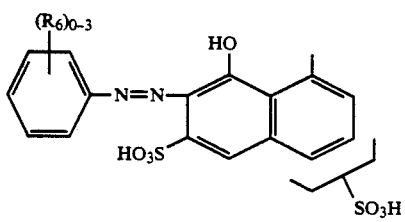 (6)

in which $R_6$ is $C_1$-$C_4$alkyl, $C_1$-$C_4$alkoxy, halogen, carboxyl and sulfo.

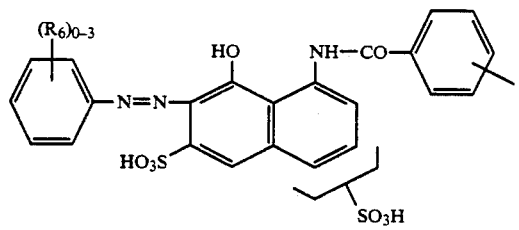 (7)

in which $R_6$ is $C_1$-$C_4$alkyl, $C_1$-$C_4$alkoxy, halogen, carboxyl and sulfo.

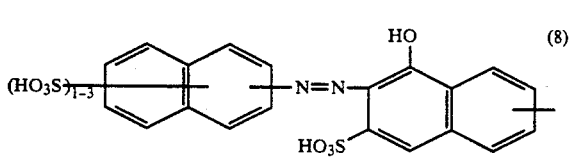 (8)

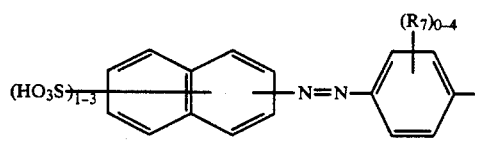 (9)

in which the radicals $R_7$, independently of one another, are halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo.

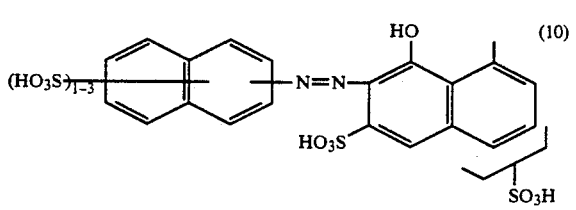 (10)

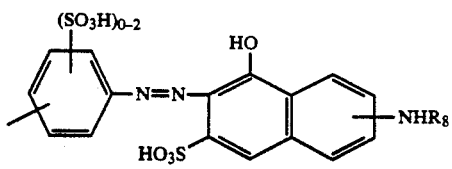 (11)

in which $R_8$ is $C_1$-$C_4$alkanoyl or benzoyl.

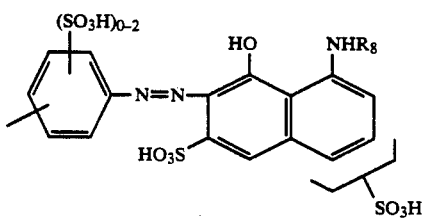 (12)

in which $R_8$ is $C_1$-$C_4$alkanoyl or benzoyl.

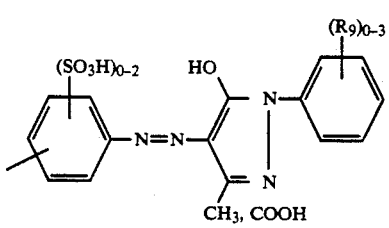 (13)

in which $R_9$ is $C_1$-$C_4$alkyl, $C_1$-$C_4$alkoxy, halogen, carboxyl or sulfo.

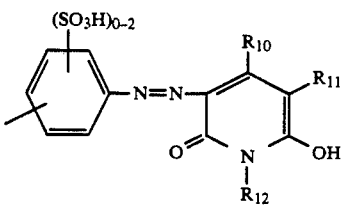 (14)

in which $R_{12}$ and $R_{10}$ independently of one another are hydrogen, $C_1$-$C_4$alkyl or phenyl, and $R_{11}$ is hydrogen, cyano, carbamoyl or sulfomethyl.

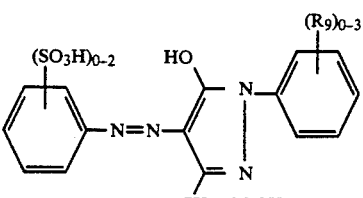 (15)

in which $R_9$ is $C_1$-$C_4$alkyl, $C_1$-$C_4$alkoxy, halogen, carboxyl or sulfo.

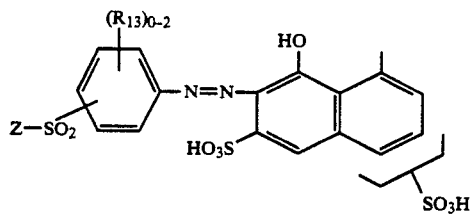 (16)

in which $R_{13}$ is $C_1$-$C_4$alkyl, $C_1$-$C_4$alkoxy, halogen, carboxyl or sulfo; and Z is β-sulfatoethyl, β-thiosulfatoethyl, β-phosphatoethyl, β-acyloxyethyl, β-haloethyl or vinyl.

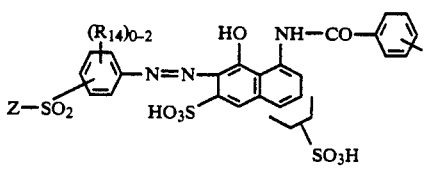 (17)

in which $R_{14}$ is 0 to 2 substituents from the group comprising $C_1$-$C_4$alkyl, $C_1$-$C_4$alkoxy, halogen, carboxyl and sulfo; and Z is β-sulfatoethyl, β-thiosulfatoethyl, β-phosphatoethyl, β-acyloxyethyl, β-haloethyl or vinyl.

Heavy metal complexes of reactive dyes of the formula (1) are furthermore particularly important; complexing heavy metals are, in particular, copper, nickel, cobalt or chromium. Copper complex azo dyes, in particular those of the formulae (5) to (15), which contain the copper atom bonded to the azo bridge in each case in the ortho position via an oxygen atom, are preferred.

Examples of azo dyes which are suitable metal complexes are:

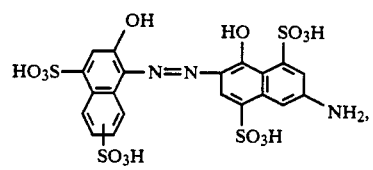 (18)

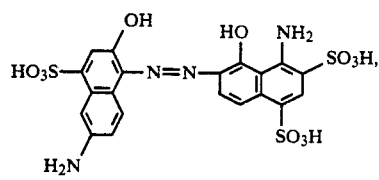 (19)

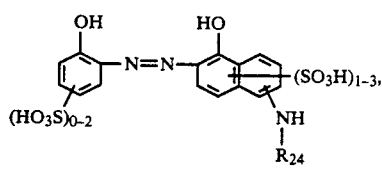 (20)

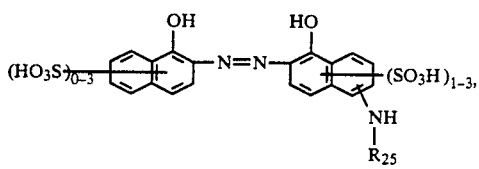 (21)

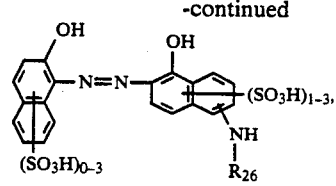 (22)

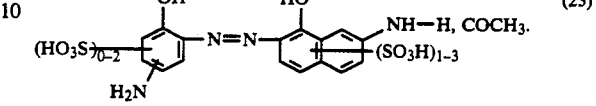 (23)

Preferred metal atoms are Cu (1:1 complex) or Cr and Co (1:2 complex). Cr and Co complexes can comprise one or two molecules of the azo compound of the formula defined above, i.e. they can have a symmetrical or unsymmetrical structure together with any other ligands.

Preferred copper complexes are, for example, those of the formulae

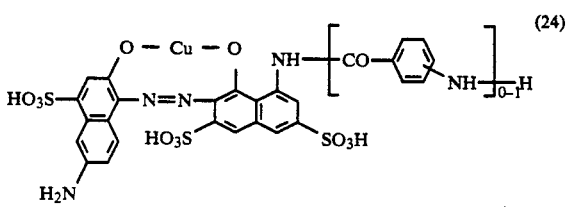 (24)

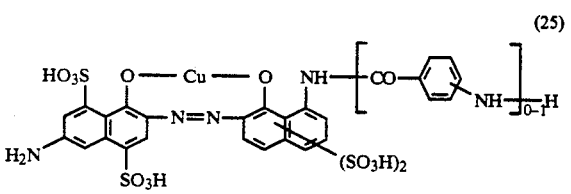 (25)

In the above formulae, the radicals $R_{24}$ to $R_{26}$ are hydrogen or $C_1$-$C_4$alkyl. The radicals $R_{24}$ to $R_{26}$ are preferably hydrogen, methyl or ethyl. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine. The benzene rings are preferably not further substituted.

The reactive dyes of the formula (1) can be prepared by a process which comprises reacting an organic dye of the formula

 (26)

$$D-NH \atop R$$

or a dye precursor, one equivalent of an s-triazine of the formula

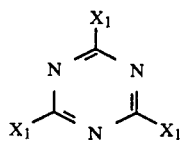 (27)

one equivalent of a diamine of the formula

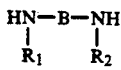 (28)

and one equivalent of a compound which introduces the radical of the formula

—CO—Y (29)

with one another in any order, D, R, $R_1$, $R_2$, B, X and Y being as defined under formula (1) and $X_1$ being halogen, or, if dye precursors are used, converting the resulting intermediates into the desired end dyes.

The preparation of the end dyes from precursors is, in particular, a coupling reaction which leads to azo dyes.

Since the individual process steps defined above can be carried out in different sequences, and where appropriate sometimes also simultaneously, various process variants are possible. The reaction is in general carried out stepwise in succession, the sequence of the single reactions between the individual reaction components advantageously depending on the particular conditions.

An important embodiment of the process according to the invention comprises first subjecting an organic dye of the formula (26) to a condensation reaction with an s-triazine of the formula (27), subjecting the resulting compound of the formula

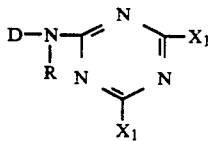 (30)

to a condensation reaction with a diamine of the formula (28), and then reacting the condensation production with a compound which introduces the radical of the formula (29).

According to a modified embodiment of the process according to the invention, reactive dyes of the formula (1) can also be prepared by reacting a component of the dye of the formula (26) which comprises a radical of the formula

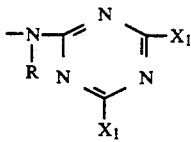 (31)

with a second component required for the preparation of the dye, subjecting the resulting dye of the formula (30) to a condensation reaction with a diamine of the formula (28), and then reacting the product with a compound which introduces the radical of the formula (29).

It depends here on the structure of the starting substances which of the possible process variants give the best results, or under what specific conditions, for example at what condensation temperature, the reaction is most advantageously to be carried out.

Since hydrolysis of a halotriazine radical occurs under certain conditions, an intermediate which contains acetylamino groups must be hydrolysed for the purpose of splitting off the acetyl groups, before it is subjected to a condensation reaction with a halotriazine. What reaction is advantageously carried out first, for example in the preparation of a secondary condensation product of a compound of the formula (28), the triazine of the formula (27) and the dye of the formula (26) or a precursor, that of the triazine with the compound of the formula (28) or with the dye or a precursor of the dye, differs from case to case and depends in particular on the solubility of the participating amino compounds and the basicity of the amino groups to be acylated.

An embodiment can be used, if appropriate, in which dye precursors are used as starting substances. This embodiment is suitable for the preparation of reactive dyes of the formula (1) in which D is the radical of a dye composed of two or more than two components, for example a monoazo, disazo, trisazo or metal complex azo dye.

The reactive dyes of the formula (1) of all the classes of dye can in principle be prepared in a manner known per se or by a procedure analogous to known procedures by using precursors or intermediates for dyes comprising fibre-reactive radicals according to formula (1) as starting substances, or introducing these fibre-reactive radicals into intermediates which have a dye character and are suitable for this purpose.

If dye precursors are used as starting substances, the reactive dyes of the formula (1) are obtained by, for example, subjecting a component of the dye of the formula (26) which contains an —N(R)H group and a triazine of the formula (27) to a condensation reaction, carrying out a condensation reaction with a compound of the formula (28) beforehand or afterwards, subsequently reacting the product with the compound of the formula (29) and then reacting this product with another dye component to give a reactive dye of the formula (1). In the preparation of the preferred azo dyes, the diazo components and the coupling components together must comprise at least one amino group —N(R)H, and can contain further amino groups. In this case, 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid are used in particular as diazo components. If appropriate, corresponding acetylamino or nitro compounds in which the acetylamino or nitro group is converted into the $H_2N$ group by hydrolysis or reduction before the condensation with the triazine of the formula (27) are used.

If groups which are capable of metal complex formation, such as hydroxyl, carboxyl, amino or sulfo, are present in the reactive dyes prepared, the reactive dyes can also be subsequently metallised. Metal complex azo dyes are obtained, for example, by treating azo compounds which are obtained according to the invention and contain complexing groups, for example hydroxyl or carboxyl groups, in the ortho-ortho' position relative to the azo bridge, with heavy metal donor agents before or if appropriate after the condensation with the triazine of the formula (27). Copper complexes of reactive dyes of the formula (1) are of particular interest. Apart from the abovementioned method of metallisation, dealkylating metallisation, and, for the preparation of copper complexes, oxidative coppering can also be used.

Preferred embodiments of the process according to the invention comprise a) using an organic dye of the formula (26) in which R is hydrogen, methyl or ethyl;

b) using a diamine of the formula (28) in which $R_1$ is hydrogen and $R_2$ is hydrogen, methyl or ethyl;

c) using a diamine of the formula (28) in which B is $C_1$-$C_6$alkylene;

d) using a compound which introduces the radical of the formula (29), in which Y is $C_1$-$C_6$alkyl, which can be substituted by halogen, hydroxyl, cyano, $C_1$-$C_4$alkoxy, carboxyl or sulfo;

e) using a compound which introduces the radical of the formula (29), in which Y is a radical of the formula

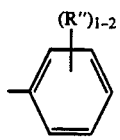

in which R" is $C_1$-$C_4$alkyl, $C_1$-$C_4$alkoxy, halogen, carboxyl or sulfo; or f) using a diamine of the formula (28), in which B is a radical of the formula

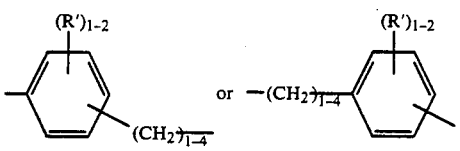

in which R' is $C_1$-$C_4$alkyl, $C_1$-$C_4$alkoxy, halogen, carboxyl or sulfo.

A particularly preferred embodiment of the process according to the invention comprises using an organic dye of the formula (26) in which R is hydrogen, methyl or ethyl, and using a diamine of the formula (28) in which $R_1$ is hydrogen, $R_2$ is hydrogen, methyl or ethyl and B is $C_1$-$C_6$alkylene or a radical

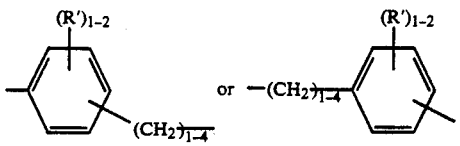

in which R' is $C_1$-$C_4$alkyl, $C_1$-$C_4$alkoxy, halogen, carboxyl or sulfo, and using a compound which introduces the radical of the formula (29) in which Y is $C_1$-$C_6$alkyl, which can be substituted by halogen, hydroxyl, cyano, $C_1$-$C_4$alkoxy, carboxyl or sulfo, or a radical

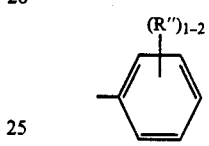

in which R" is $C_1$-$C_4$alkyl, $C_1$-$C_4$alkoxy, halogen, carboxyl or sulfo.

The most important process variants are shown in the embodiment examples.

Possible starting substances which can be used for the preparation of the reactive dyes of the formula (1) are mentioned in detail below.

Dyes of the formula (26)

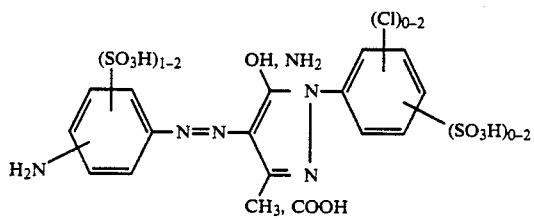

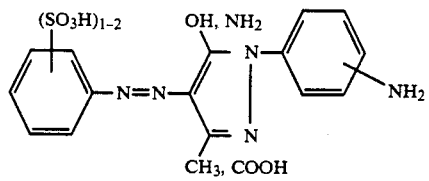

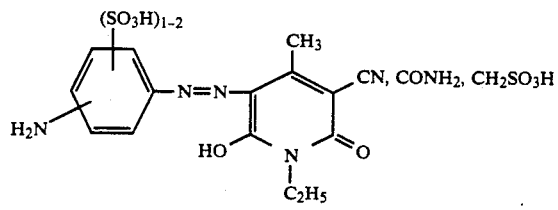

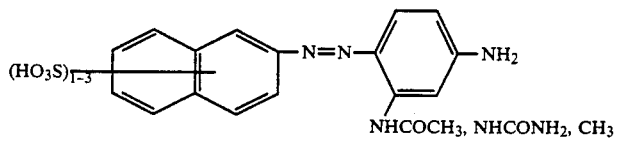

-continued
Dyes of the formula (26)
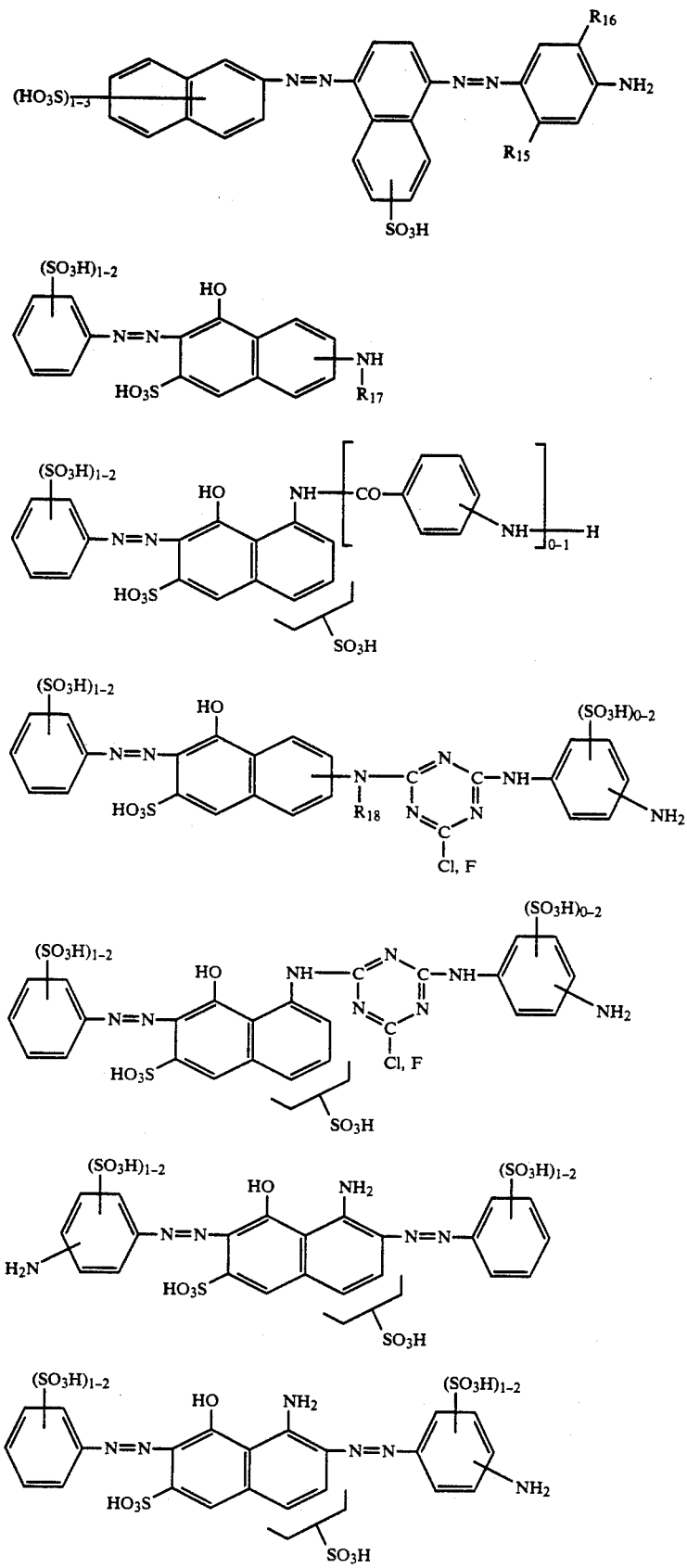

Dyes of the formula (26)
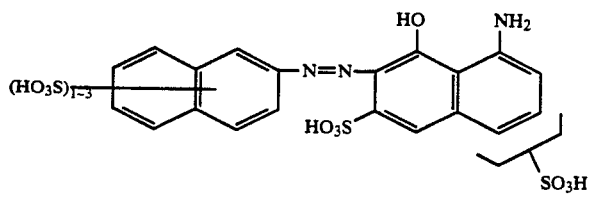
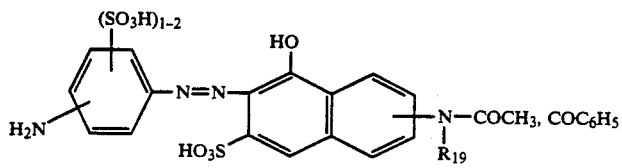
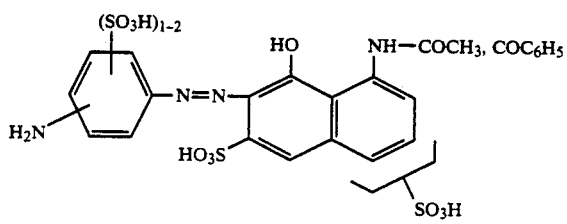
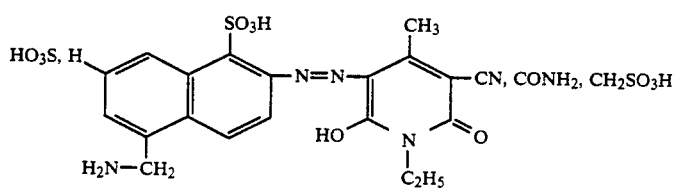
Metal complexes of dyes of the formulae:
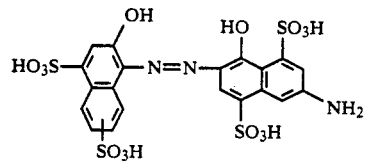
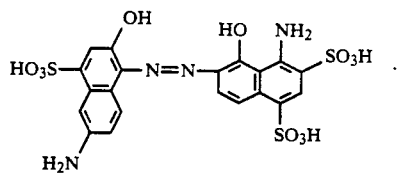
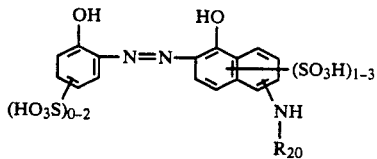
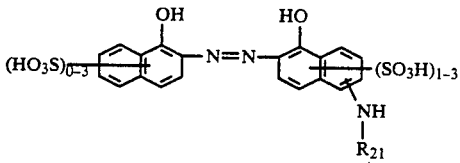
-continued
Metal complexes of dyes of the formulae:
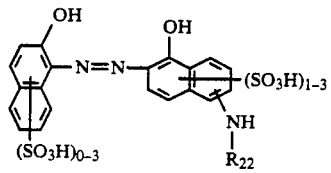
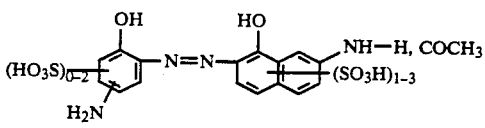
Preferred metal atoms are Cu (1:1 complex) or Cr and Co (1:2 complex). Cr and Co complexes can comprise one or two azo compounds of the abovementioned formula, i.e. they can have a symmetrical or unsymmetrical structure together with any other ligands.
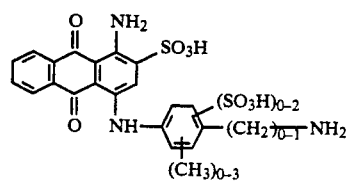

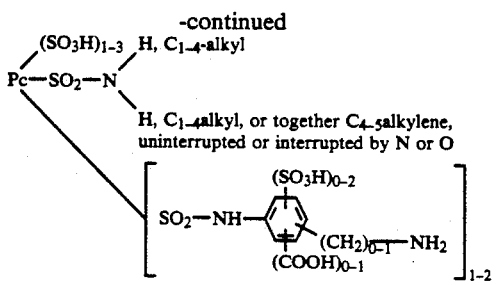

In this formula, Pc is the Cu phthalocyanine or Ni phthalocyanine radical and the total number of substituents on the Pc structure is 4.

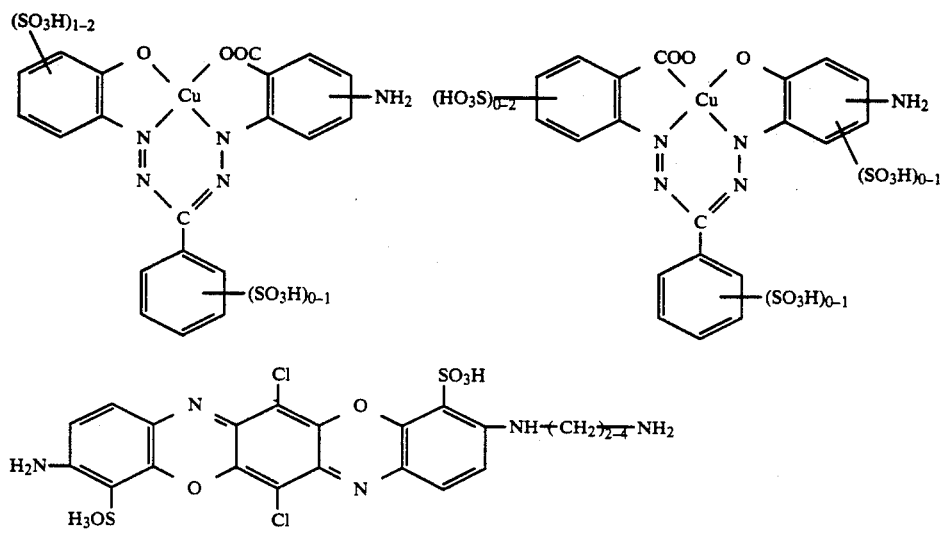

In the above formulae, the radicals $R_{17}$ to $R_{22}$ are hydrogen or $C_1$-$C_4$alkyl, and the radicals $R_{15}$ and $R_{16}$ are hydrogen, $C_1$-$C_4$alkyl, $C_1$-$C_4$alkoxy, $C_1$-$C_4$alkanoylamino, ureido or halogen, the radicals $R_{15}$ and $R_{16}$ which belong to one and the same formula being independent of one another. The radicals $R_{17}$ to $R_{22}$ are preferably hydrogen, methyl or ethyl, and the radicals $R_{15}$ and $R_{16}$ are hydrogen, methyl, ethyl, methoxy, ethoxy, acetylamino, ureido or chlorine. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine; the same applies to the anthraquinones, dioxazines and the like. The benzene rings are preferably not further substituted.

Triazines of the formula (27)

2,4,6-Trifluoro-s-triazine (cyanuric fluoride) and 2,4,6-trichloro-s-triazine (cyanuric chloride).

Diamines of the formula (28)

Ethylenediamine, 1,3-propylendiamine, 1,2-propylendiamine, N-methyl-1,3-propylenediamine and 4-aminomethylaniline.

Compounds which introduce the radical of the formula (29)

Acetic anhydride, acetyl chloride, propionyl chloride, benzoyl chloride.

The condensation of a 2,4,6-trihalo-s-triazine with the dye of the formula (26) or the component which comprises a group —N(R)H and can be diazotised or undergo coupling is preferably carried out in aqueous solution or suspension at low temperatures, preferably between 0° and 5° C., and at a weakly acidic, neutral to weakly alkaline pH. The hydrogen halide liberated during the condensation is advantageously neutralised continuously by addition of aqueous alkali metal hydroxides, carbonates or bicarbonates. For further reaction of the halotriazine dyes thus obtained or for reaction of the 2,4,6-trihalo-s-triazine with the compounds of the formula (28), the free amines or salts thereof, preferably in the form of the hydrochloride, are employed. The reaction is carried out at temperatures of, for example, between 0° and 40°, preferably between 5° and 25° C., with the addition of acid-binding agents, preferably sodium carbonate, in a pH range of 2 to 8, preferably 5 to 6.5.

The condensation of the halotriazine with a compound of the formula (28) can be carried out before or after the condensation of the halotriazine with a dye of the formula (26). The condensation of the halotriazine with a compound of the formula (28) is preferably carried out in aqueous solution or suspension at a low temperature (0° to 40° C.) and at a weakly acid to neutral pH. Here also, the hydrogen halide liberated during the condensation is advantageously neutralised by continuous addition of aqueous alkali metal hydroxides, carbonates or bicarbonates.

The condensation of the compound which introduces the radical of the formula (29) with the compound of the formula (28) or (30) is preferably carried out in aqueous solution or suspension at low temperatures (0° to 10°) and at a weakly acid, neutral to weakly alkaline pH. Hydrogen halide liberated during the condensation is advantageously neutralised continuously by addition of aqueous alkali metal hydroxides, carbonates or bicarbonates.

The diazotisation of the diazo components or of the intermediates containing a diazotisable amino group is as a rule carried out by the action of nitrous acid in aqueous-mineral acid solution at a low temperature. The coupling to the coupling component is carried out at strongly acid, neutral to weakly alkaline pH values.

The reactive dyes of the formula (1) are suitable for dying and printing a wide range of materials, such as silk, leather, wool, polyamide fibres and polyurethanes, and in particular all types of cellulosic fibre materials.

Such fibre materials are, for example, the naturally occurring cellulose fibres, such as cotton, linen and hemp, and cellulose and regenerated cellulose. The reactive dyes of the formula (1) are also suitable for dyeing or printing fibres which contain hydroxyl groups and are present in blend fabrics, for example blends of cotton with polyamide fibres, or in particular polyester fibres.

The dyes according to the invention can be applied to the fibre material and fixed on the fibres in various ways, in particular in the form of aqueous dye solutions and printing pastes. They are suitable both for the exhaust method and for dyeing by the padding method, in which the goods are impregnated with aqueous dye solutions, which contain salt if appropriate, and the dyes are fixed after an alkali treatment or in the presence of alkali, if appropriate with the application of heat. After fixing, the dyeings or prints are rinsed thoroughly with cold and hot water, if appropriate with addition of a dispersing agent which promotes diffusion of the unfixed portions.

If the reactive dyes of the formula (1) in which D is the radical of an anthraquinone dye have an inadequate solubility in the alkaline dye liquor, this deficiency can be overcome in the manner known from the literature by addition of dispersants or other non-coloured compounds, for example a naphthalenesulfonic acid-formaldehyde condensate or, in particular, anthraquinone-2-sulfonic acid.

The reactive dyes of the formula (1) are distinguished by a good fixing capacity and a very good build-up capacity. They can be employed by the exhaust method over a very wide temperature range and are therefore also particularly suitable for dyeing cotton-polyester blend fabrics under the conditions recommended for such fabrics. The degrees of fixing are high and the difference between the degree of exhaustion and degree of fixing is remarkably small, i.e. the soap loss is very low. The reactive dyes of the formula (1) are also suitable for printing, in particular on cotton, but similarly also for printing nitrogen-containing fibres, for example wool or silk, or blend fabrics comprising wool or silk.

The dyeings and prints produced on cellulose fibre materials with the dyes according to the invention have a high colour strength and a high fibre-dye bonding stability, both in the acid and in the alkaline range, and furthermore a good fastness to light and very good wet fastness properties, such as fastnesses to washing, water, sea water, crossdyeing and perspiration, as well as a good fastness to pleating, hot press fastness and fastness to rubbing and a very good fastness to chlorinated water.

The dyes of the formula (1) according to the invention are present either in the form of their free sulfonic acid or, preferably, as salts thereof, for example the alkali metal salts, alkaline earth metal salts or ammonium salts, or as salts of an organic amine. Examples are the sodium salts, lithium salts or ammonium salts or the triethanolamine salt.

The following examples serve to illustrate the invention. The temperatures are given in degrees Celsius, and parts and percentages are by weight, unless stated otherwise. Parts by weight relate to parts by volume as the kilogram relates to the liter.

The preparation of the monoazo or disazo intermediate compounds is not described in all cases in the following embodiment examples, but easily follows be seen from the general description.

EXAMPLE 1

27.3 parts of the dye of the formula

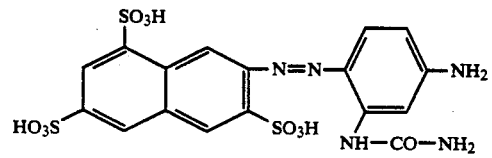

are dissolved in 600 parts of water and subjected to a condensation reaction with 7 parts of 2,4,6-trifluoro-1,3,5-triazine. When diazotisable amino groups are no longer detectable, 3 to 5 parts of ethylenediamine are added to the dye solution at 0° to 5° and a pH of 5 to 7. The pH of the reaction mixture is increased to 8.0 by addition of sodium carbonate and the temperature is slowly increased to 25°. When the condensation has ended, acylation is carried out with 8 to 15 parts of acetic anhydride at a pH of 8 to 9. The dye, which, in the form of the free acid, has the formula

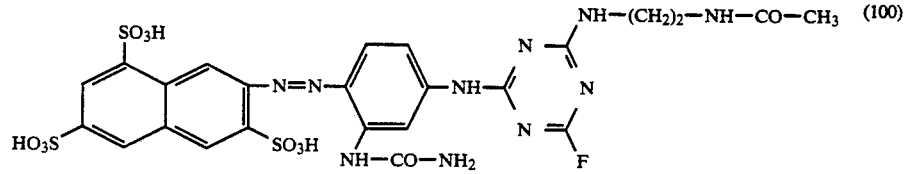

is then precipitated with sodium chloride, after addition of buffer salts, filtered off, washed and dried. The resulting dye is an orange powder. It dyes cotton in golden yellow shades.

EXAMPLE 2

27.3 parts of the dye of the formula

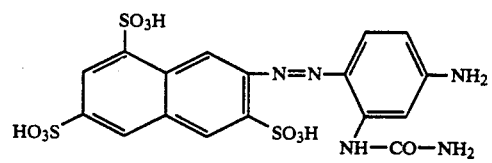

are dissolved in 600 parts of water and subjected to a condensation reaction with 7 parts of 2,4,6-trifluoro-1,3,5-triazine. When diazotisable amino groups are no longer detectable, 4 to 6 parts of 1,3-propylenediamine are added to the dye solution at 0° to 5° and a pH of 5 to 7. The pH of the reaction mixture is increased to 8.0 by addition of sodium carbonate and the temperature is slowly increased to 25°. When the condensation has ended, acylation is carried out with 8 to 15 parts of acetic anhydride at a pH of 8 to 9. The dye, which, in the form of the free acid, has the formula

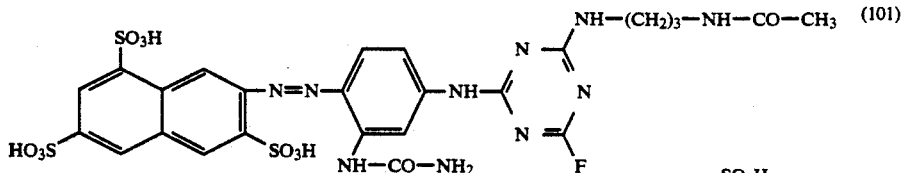

is then precipitated with sodium chloride, after addition of buffer salts, filtered off, washed and dried. The resulting dye is an orange powder. It dyes cotton in golden yellow shades.

EXAMPLE 3

27.3 parts of the dye of the formula

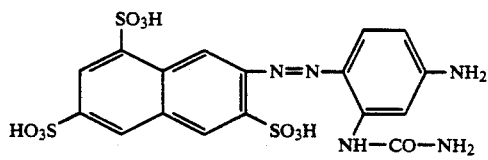

are dissolved in 600 parts of water and subjected to a condensation reaction with 7 parts of 2,4,6-trifluoro-1,3,5-triazine. When diazotisable amino groups are no longer detectable, 4 to 5 parts of 1,2-propylenediamine are added to the dye solution at 0° to 5° and a pH of 5 to 7. The pH of the reaction mixture is increased to 7.5 by addition of sodium carbonate and the temperature is slowly increased to 25°. When the condensation has ended, acylation is carried out with 7 to 15 parts of acetic anhydride at a pH of 8 to 9. The dye, which, in the form of the free acid, has the formula

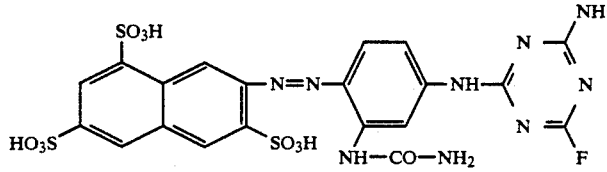

is then precipitated with sodium chloride, after addition of buffer salts, filtered off, washed and dried. The resulting dye is an orange powder. It dyes cotton in golden yellow shades.

EXAMPLE 4

27.3 parts of the dye of the formula

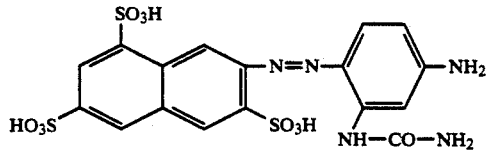

are dissolved in 600 parts of water and subjected to a condensation reaction with 7 parts of 2,4,6-trifluoro-1,3,5-triazine. When diazotisable amino groups are no longer detectable, 5 to 6 parts of N-methyl-1,3-propylenediamine are added to the dye solution at 0° to 5° and a pH at a 5 to 7. The pH of the reaction mixture is increased to 7.5 by addition of sodium carbonate and the temperature is slowly increased to 25°. When the condensation has ended, acylation is carried out with 11 to 15 parts of acetic anhydride at a pH of 8 to 10. The dye, which, in the form of the free acid, has the formula is then precipitated with sodium chloride, after addition of buffer salts, filtered off, washed and dried. The resulting dye is an orange powder. It dyes cotton in golden yellow shades.

EXAMPLE 5

27.3 parts of the dye of the formula

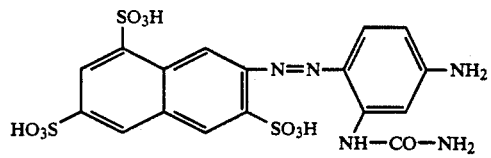

are dissolved in 600 parts of water and subjected to a condensation reaction with 7 parts of 2,4,6-trifluoro-1,3,5-triazine. When diazotisable amino groups are no longer detectable, 10 to 12 parts of the compound of the formula

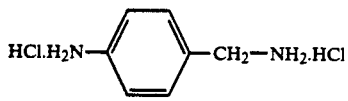

are added to the dye solution at 0° to 5° and at a pH of 4.5. The pH of the reaction mixture is increased to 7.5 by addition of sodium carbonate and the temperature is slowly increased to 25°. When the condensation has ended, acylation is carried out with 7 to 12 parts of acetic anhydride at a pH of 8 to 9. The dye, which, in the form of the free acid, has the formula

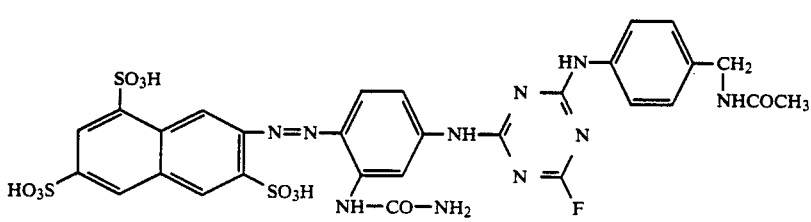

is then precipitated with sodium chloride, after addition of buffer salts, filtered off, washed and dried. The resulting dye is an orange powder. It dyes cotton in golden yellow shades.

If the procedure is carried out as described in Examples 1 to 5, but instead of the chromophore of the formula

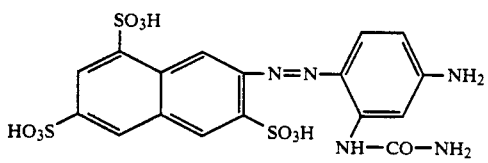

used in that example, equivalent amounts of the compounds defined in column I in the following table are employed and a radical of the formula

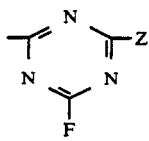

in which Z is one of the following radicals:

(104)

—NH(CH$_2$)$_2$NHCOCH$_3$,
—NH(CH$_2$)$_3$NHCOCH$_3$
—NH—CH$_2$—CH(CH$_3$)—NHCOCH$_3$,
—NH—(CH$_2$)$_3$—N(CH$_3$)—COCH$_3$,

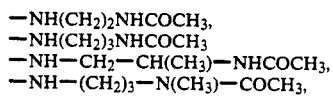
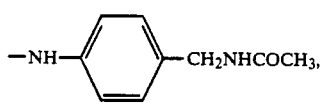

—NH(CH$_2$)$_2$—NHCO(CH$_2$)$_2$—COOH is introduced into this compound, further useful dyes which dye cotton in the shades defined in column II are obtained.

| I | II |
|---|---|
| 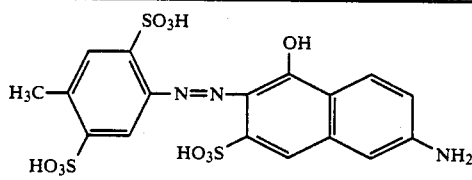 | scarlet |
| 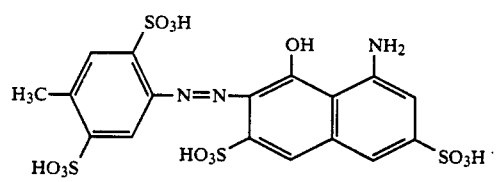 | red |
| 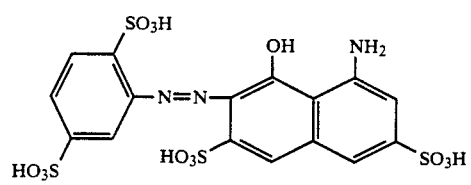 | red |

| I | II |
|---|---|
| 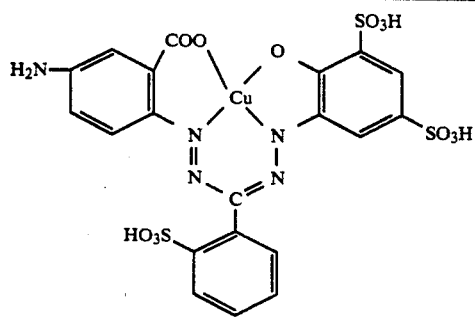 | blue |
| 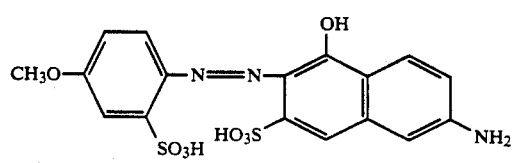 | scarlet |
| 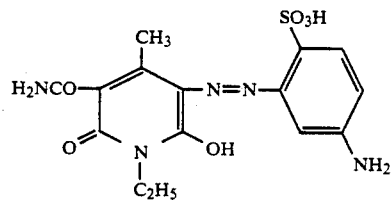 | greenish yellow |
| 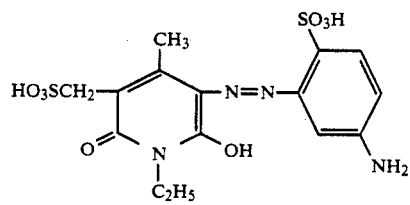 | greenish-yellow |
| 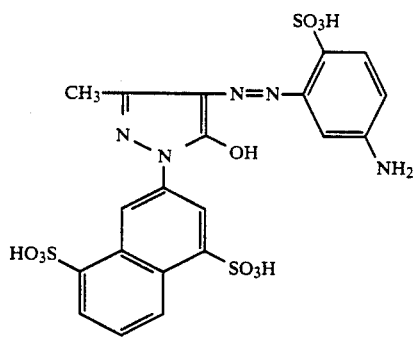 | yellow |
| 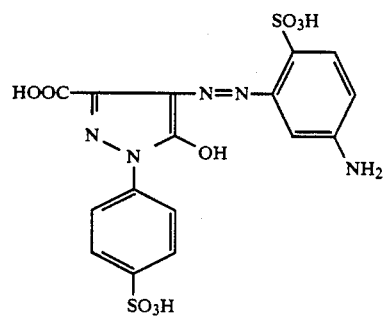 | yellow |

-continued
| I | II |
|---|---|
| 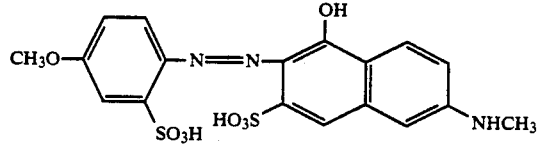 | scarlet |
| 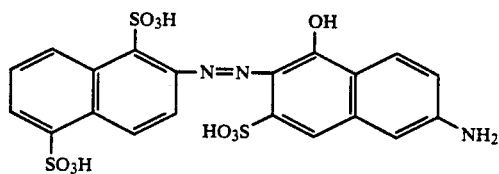 | orange |
| 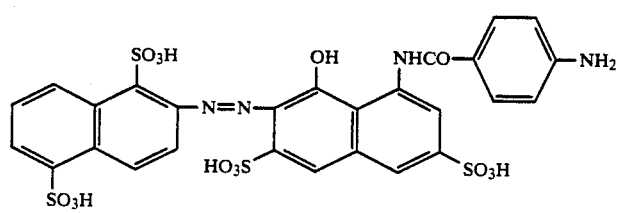 | bluish-red |
| 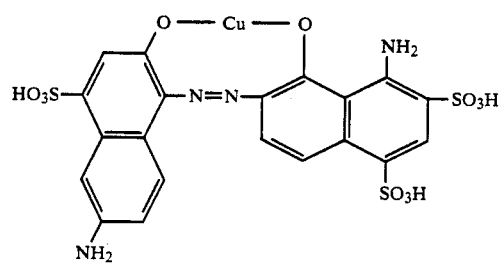 | blue |
| 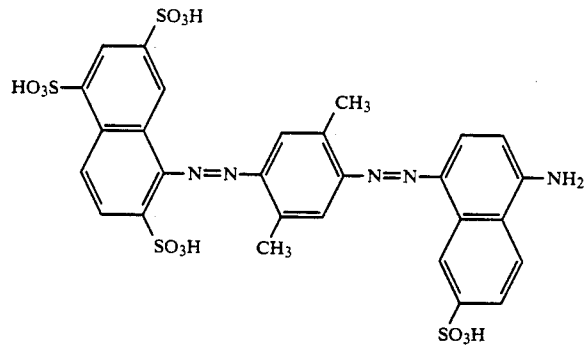 | brown |
| 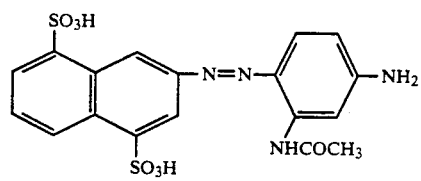 | yellow |
| 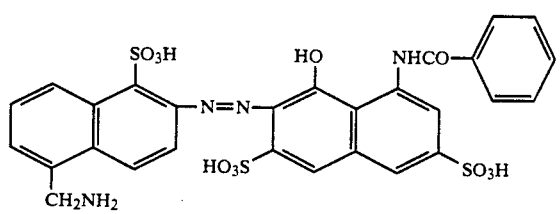 | bluish red |

-continued
| I | II |
|---|---|
| 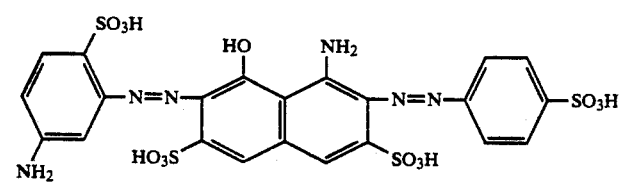 | dark blue |
| 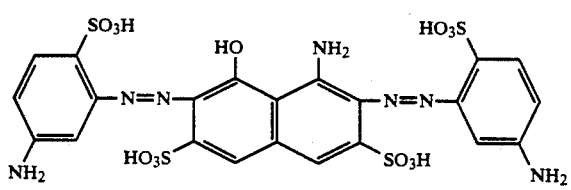 | greenish navy blue |
| 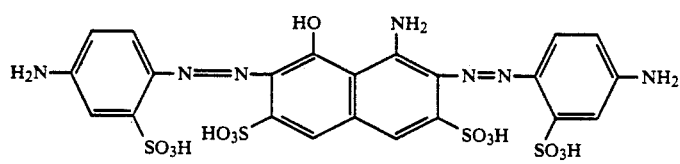 | greenish blue |
| 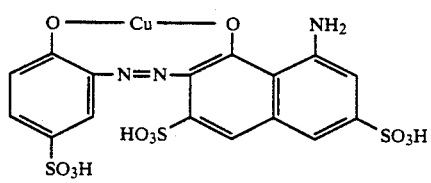 | violet |
| 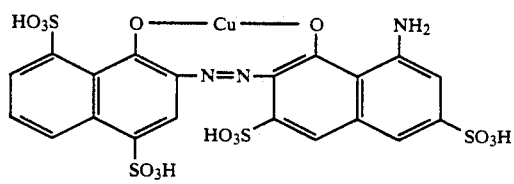 | blue |
| 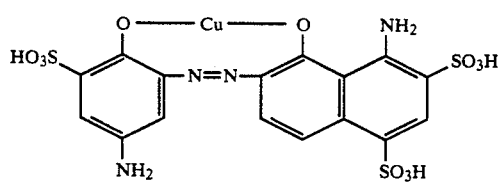 | reddish blue |
| 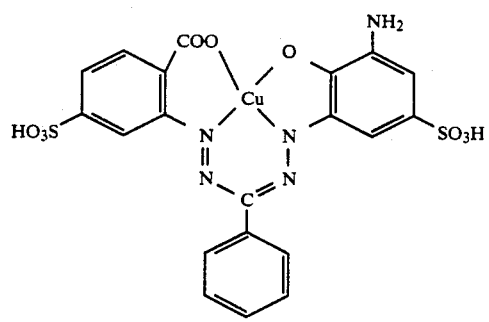 | blue |

-continued
| I | II |
|---|---|
| 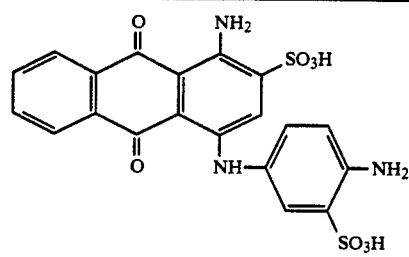 | greenish blue |
| 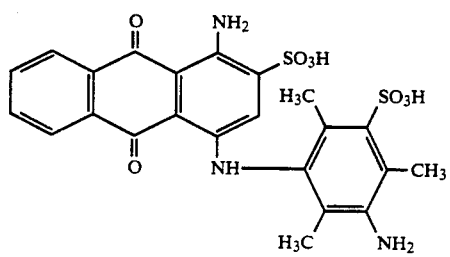 | cobalt blue |
| 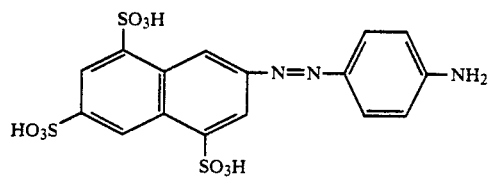 | yellow |
| 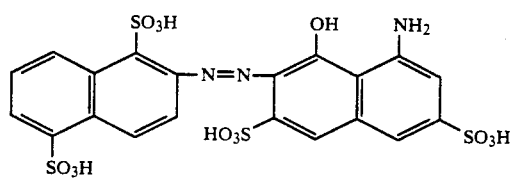 | bluish red |
| 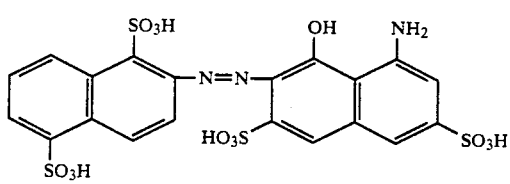 | bluish red |
| 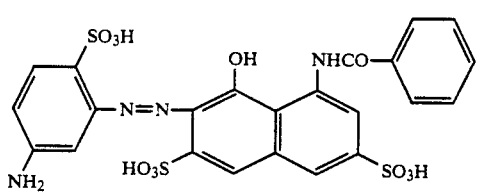 | bluish red |
| 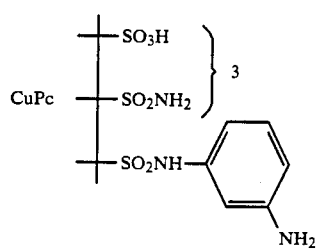 | turquoise |

-continued
| I | II |
|---|---|
| 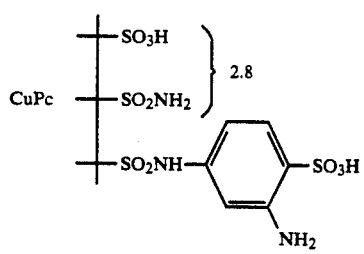 | turquoise |
| 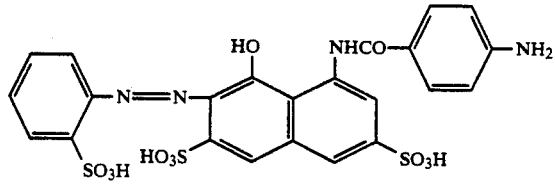 | red |
| 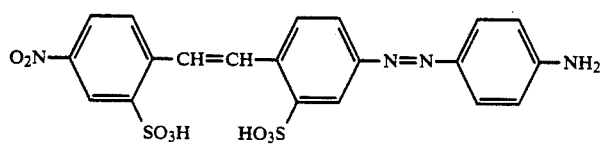 | yellow |
| 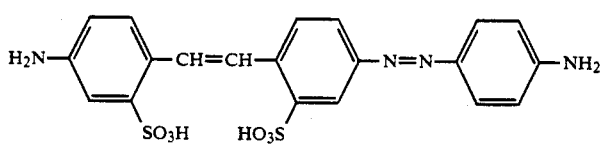 | yellow |
| 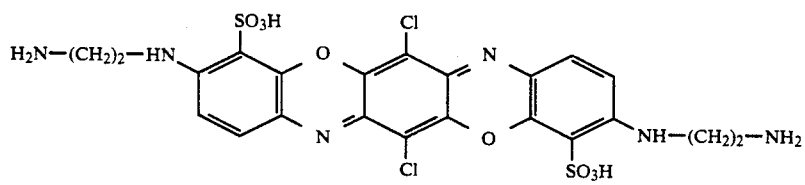 | blue |
| 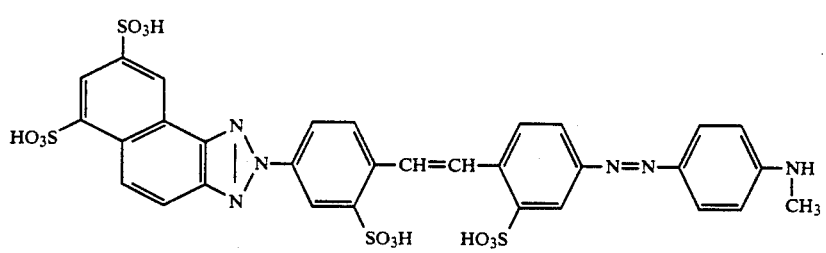 | yellow |
| 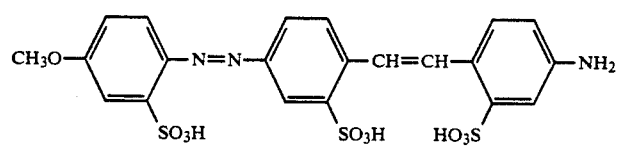 | yellow |
| 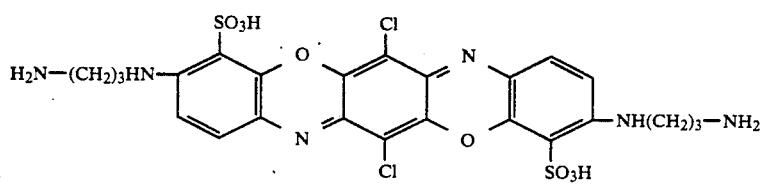 | blue |

| I | II |
|---|---|
| 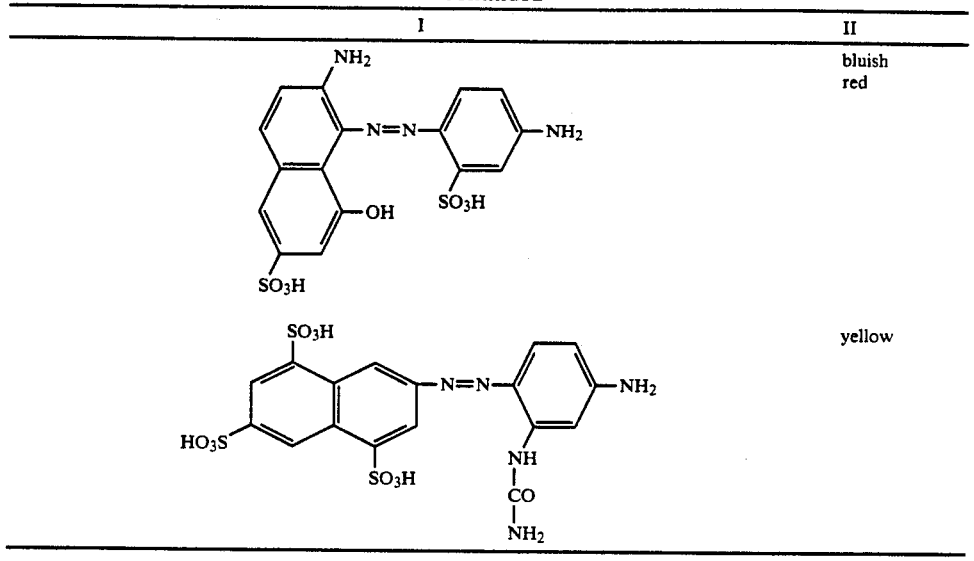 | bluish red |
| | yellow |

DYEING PROCEDURE I 2 parts of the dye obtained according to Example 1 are dissolved in 400 parts of water; 1500 parts of a solution which contains 53 g of sodium chloride per liter are added. 100 parts of a cotton fabric are introduced into this dye bath at 40° C. After 45 minutes, 100 parts of a solution containing 16 g of sodium hydroxide and 20 g of anhydrous $Na_2CO_3$ per liter are added. The temperature of the dye bath is kept at 40° C. for a further 45 minutes. The dyed goods are then rinsed, soaped at the boil with a nonionic detergent for quarter of an hour, rinsed again and dried.

DYEING PROCEDURE II 2 parts of the reactive dye obtained according to Example 1 are dissolved in 400 parts of water; 1500 parts of a solution which contains 53 g of sodium chloride per liter are added. 100 parts of a cotton fabric are introduced into this dye bath at 35° C. After 20 minutes, 100 parts of a solution containing 16 g of sodium hydroxide and 20 g of anhydrous $Na_2CO_3$ per liter are added. The temperature of the dye bath is kept at 35° C. for a further 15 minutes. Thereafter the temperature is increased to 60° C. in the course of 20 minutes. The temperature is kept at 60° C. for a further 35 minutes. The goods are then rinsed, soaped at the boil with a nonionic detergent for quarter of an hour, rinsed again and dried.

DYEING PROCEDURE III 8 parts of the reactive dye obtained according to Example 1 are dissolved in 400 parts of water; 1400 parts of a solution which contains 100 g of sodium sulfate per liter are added. 100 parts of a cotton fabric are introduced into this dye bath at 25° C. After 10 minutes, 200 parts of a solution containing 150 g of trisodium phosphate per liter are added. The temperature of the dye bath is then increased to 60° C. in the course of 10 minutes. The temperature is kept at 60° C. for a further 90 minutes. The goods are then rinsed, soaped at the boil with a nonionic detergent for quarter of an hour, rinsed again and dried.

DYEING PROCEDURE IV 4 parts of the reactive dye obtained according to Example 1 are dissolved in 50 parts of water. 50 parts of a solution which contains 5 g of sodium hydroxide and 20 g of anhydrous $Na_2CO_3$ per liter are added. A cotton fabric is padded with the resulting solution such that its liquor pickup, is 70%, and is then wound onto a fabric roll. The cotton fabric is left in this way at room temperature for 3 hours. The dyed goods are then rinsed, soaped at the boil with a nonionic detergent for quarter of an hour, rinsed again and dried.

DYEING PROCEDURE V 6 parts of the reactive dye obtained according to Example 1 are dissolved in 50 parts of water. 50 parts of a solution which contains 16 g of sodium hydroxide and 0.04 g of water-glass (38%) per liter are added. A cotton fabric is padded with the resulting solution such that its liquor pickup is 70%, and is then wound onto a fabric roll. The cotton fabric is left in this way at room temperature for 10 hours. The dyed goods are then rinsed, soaped at the boil with a nonionic detergent for quarter of an hour, rinsed again and dried.

DYEING PROCEDURE VI 2 parts of the reactive dye obtained according to Example 1 are dissolved in 100 parts of water, with addition of 0.5 parts of sodium m-nitrobenzenesulfonate. A cotton fabric is impregnated with the resulting solution such that its liquor pickup is 75%, and is then dried. The fabric is then impregnated with a solution, heated to 20° C., which contains 4 g of sodium hydroxide and 300 g of sodium hydroxide and 300 g of sodium chloride per liter, and is squeezed off to a liquor pickup of 75%, and the dyeing is steamed at 100 to 102° C. for 30 seconds, soaped in a 0.3% boiling solution of a nonionic detergent for quarter of an hour, rinsed again and dried.

PRINTING PROCEDURE I 3 parts of the reactive dye obtained according to Example 1 are sprinkled, while stirring rapidly, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and the resulting printed material is dried and steamed in saturated steam at 102° C. for 2 minutes. The printed fabric is then rinsed, if appropriate soaped at the boil and rinsed again, and then dried.

PRINTING PROCEDURE II 5 parts of the reactive dye obtained according to Example 1 are sprinkled, while stirring rapidly, into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the resulting printing paste, the stability of which complies with industrial requirements, and the resulting printed material is dried and steamed in saturated steam at 102° C. for 8 minutes. The printed fabric is then rinsed, if appropriate soaped at the boil and rinsed again, and then dried.

What is claimed is:

1. A reactive dye of the formula

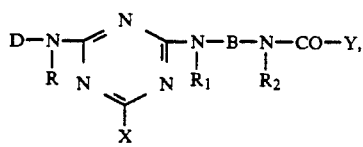

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye;

R is hydrogen or alkyl having 1 to 4 carbon atoms, unsubstituted or substituted by hydroxyl, cyano, carboxyl, sulfo or sulfato;

X is fluorine or chlorine;

B is $C_1-C_{10}$-alkylene, unsubstituted or substituted by halogen, $C_1-C_4$-alkyl, $C_1-C_4$-alkoxy, carboxyl or sulfo;

Y is $C_1-C_8$-alkyl, unsubstituted or substituted by halogen, hydroxyl, cyano, carboxyl, $C_1-C_4$-alkoxy, hydroxy-$C_2-C_4$-alkoxy, sulfo, sulfato, phenyl or naphthyl, or Y is phenyl or naphthyl, both of them unsubstituted or substituted by $C_1-C_4$-alkyl, $C_1-C_4$-alkoxy, halogen, carboxyl, hydroxyl or sulfo, or Y is furanyl, thiophenyl, pyrazolyl, pyridinyl, pyrimidinyl, quinolinyl, benzimidazolyl, benzothiazolyl and benzoxazolyl;

$R_2$ is hydrogen or alkyl having 1 to 4 carbon atoms, unsubstituted or substituted by halogen, hydroxyl, cyano, $C_1-C_4$alkoxy, $C_1-C_4$alkoxycarbonyl, carboxyl, carbamoyl, sulfamoyl, sulfo or sulfato; and $R_1$, independently of $R_2$, has the same meaning as $R_2$ or is a radical of the formula

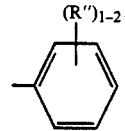

in which B, Y and $R_2$ are as defined under formula (1), independently of these meanings.

2. A reactive dye according to claim 1, in which R is hydrogen, methyl or ethyl.

3. A reactive dye according to claim 1, in which $R_1$ is hydrogen and $R_2$ is hydrogen, methyl or ethyl.

4. A reactive dye according to claim 1, in which B is $C_1-C_6$alkylene and Y is $C_1-C_6$alkyl, unsubstituted or substituted by halogen, hydroxyl, cyano, $C_1-C_4$alkoxy, carboxyl or sulfo.

5. A reactive dye according to claim 1, in which Y is a radical

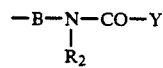

in which R'' is $C_1-C_4$alkyl, $C_1-C_4$alkoxy, halogen, carboxyl or sulfo.

6. A reactive dye according to claim 1, in which the radical of the formula

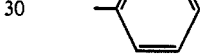

is a radical of the formula

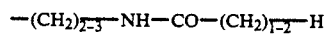

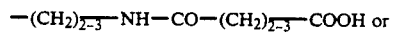

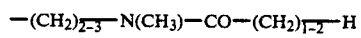

7. A reactive dye according to claim 1, in which D is the radical of a monoazo, disazo, phthalocyanine, formazan or dioxazine dye.

* * * * *